Patented June 17, 1952

2,600,539

UNITED STATES PATENT OFFICE 2,600,539

METHOD FOR PRODUCING SALTS OF d-TUBOCURARINE

Nickolas D. Jenesel, Dearborn, William R. Coleman, Grosse Pointe, and Harry M. Crooks, Jr., Detroit, Mich., assignors to Parke, Davis & Company, Detroit, Mich., a corporation of Michigan No Drawing. Application April 21, 1947, Serial No. 742,984

15 Claims. (Cl. 260—236)

This invention relates to d-tubocurarine chloride and other similar d-tubocurarine derivatives and to a method for obtaining the same.

d-Tubocurarine chloride is the active constituent of curare, a plant extract used as an arrow poison and, more recently, in its purified form in medicine. d-Tubocurarine chloride which exerts a relaxing effect upon the musculature is useful in the treatment of spastic paralysis, as an adjunct to shock therapy in the treatment of certain mental disorders. However, because of d-tubocurarine chloride's low margin of safety (e. g. the range of dosage between that giving the desired relaxation of the skeletal muscles and that giving the undesirable toxic paralysis of the respiratory muscle) it is essential that it be used in substantially pure form in order to eliminate the danger of an overdose due to improper standardization of the product. Unfortunately, the inefficiency of the prior art purification methods have made it virtually impossible to produce d-tubocurarine chloride in substantially pure form and as a consequence, the wide-spread usage of this valuable medicinal has been greatly retarded. The d-tubocurarine chloride available for medical use at the present time is produced by a modified process which involves the use of a number of these prior art purification methods. This process leaves much to be desired in the way of simplicity and operating costs and hence there still remains a definite need for a cheap and simple process for the isolation of d-tubocurarine chloride from crude curare.

It is an object of this invention to provide a cheap and simple process for the isolation of d-tubocurarine chloride in substantially pure form from crude curare.

It is also an object of the invention to provide a process for the preparation of other d-tubocurarine derivatives from crude curare.

In accordance with our invention the d-tubocurarine chloride present in an aqueous extract of crude curare is adsorbed on activated carbon, eluted from the carbon by treatment with a water-miscible, lower aliphatic alcohol or ketone, the solvent evaporated from the eluate and the residual crude d-tubocurarine chloride, after solution in water, converted to the picrate salt by reaction with picric acid. The picrate salt is dissolved in an aqueous solution of a water-miscible, lower aliphatic ketone or alcohol, such as acetone, methyl ethyl ketone, methanol or ethanol, the solution contacted with an acid-adsorbing resin containing adsorbed hydrochloric acid and the resultant solution concentrated to obtain the desired d-tubocurarine chloride in crystalline, substantially pure form.

By further concentrations of the mother liquor additional quantities of the crystalline d-tubocurarine chloride can be obtained. After recrystallization of the combined crops of crystalline material from a minimum of hot water, the product is white in color and gives a clear, colorless solution when dissolved in water. The d-tubocurarine chloride obtained by this process possesses physical and pharmacological properties commensurate with those reported for pure, crystalline d-tubocurarine chloride in the prior art.

In its broader aspects our invention provides a method for obtaining other pharmacologically active d-tubocurarine derivatives. This is accomplished by employing, in the above described procedure, an acid-adsorbing resin impregnated with other strong mineral acids. Thus when an acid-adsorbing resin containing adsorbed hydrogen bromide is substituted for one impregnated with hydrogen chloride the d-tubocurarine picrate, on contact with the resin, is converted to d-tubocurarine bromide instead of to d-tubocurarine chloride. In a similar manner by employing acid-adsorbing resins containing adsorbed sulfuric, hydriodic or phosphoric acids in our process d-tubocurarine sulfate, iodide and phosphate, respectively, can be obtained.

A wide variety of synthetic acid-adsorbing, e. g. anion-exchange, resins containing free amino and/or imino groups can be used, after impregnation with a strong mineral acid, in our process for effecting the conversion of the d-tubocurarine picrate to the more water-soluble, pharmacologically useful d-tubocurarine derivatives. Such resins are commonly prepared by the reaction of formaldehyde with aromatic mono or polyamines or with aliphatic polyamines. In the preparation of some of these resins both aromatic and aliphatic amines are employed while in certain other cases the aromatic amine-formaldehyde condensation products are treated with cyanamide or dicyanamide to introduce free guanidino groups into the molecule.

The conditions under which the conversion of the d-tubocurarine picrate to the more water-soluble, pharmacologically useful d-tubocurarine derivatives can be effected vary somewhat with the resin and solvent employed as well as with the d-tubocurarine derivative to be produced. In general, the solvent mixture should contain enough water to dissolve appreciable amounts of the d-tubocurarine derivative to be formed and at the same time not so much water as to render the d-tubocurarine picrate insoluble in the solvent mixture. For example, in the case in which aqueous acetone is employed as a solvent for the conversion of d-tubocurarine picrate to the corresponding chloride the effective limiting concentrations of water are from about 20 to 70%, the preferred percentage being in the neighborhood of about 50%.

In that step of our process wherein the active d-tubocurarine chloride, which has been absorbed on activated carbon from a crude aqueous curare extract, is eluted with an organic solvent, we have found that the active d-tubocurarine chloride is selectively eluted by solvents containing less than about 10% of water. When the elution is carried out in this manner many impurities, which have been troublesome in previous purification processes, remain on the carbon while the d-tubocurarine chloride is eluted almost completely. Some of the water-miscible, lower aliphatic alcohols and ketones which may be used to elute the active material from the carbon in this step of the process are methanol, ethanol, acetone and methyl ethyl ketone.

The step of adsorption of d-tubocurarine chloride on activated carbon and its elution therefrom as well as the step of converting the d-tubocurarine picrate to a more water-soluble derivative by employment of an acid-adsorbing resin are both of general applicability in that they are individually useful in connection with other methods of producing d-tubocurarine derivatives.

The invention is illustrated by the following examples.

Example 1

10 lbs. of dried crude curare syrup derived from *Chondrodendron tomentosum* is extracted with 25 liters of cold water by stirring the slurry for about one hour. The solids are separated by filtration or centrifugation and the residue re-extracted with four 16 liter portions of cold water. The combined aqueous extracts are concentrated in vacuo below about 80° to 90° C. to a volume of approximately 36 liters, allowed to stand overnight and filtered to remove any sediment. The crude curare extract thus obtained is ready for use in the isolation procedure.

The d-tubocurarine chloride present in the crude extract is adsorbed on activated carbon by stirring the extract with 11 kilograms of activated carbon for one hour. The carbon containing the active principle is filtered off and washed with 60 to 80 liters of cold water. If the original filtrate is not colorless or has a polarimeter rotation of over 0.1°, another kilogram of the activated carbon is added and the adsorption procedure repeated before proceeding with the washing of the carbon.

After pressing the water out of the carbon containing the adsorbed active material as completely as possible, the carbon is suspended in 32 liters of methanol and the mixture stirred at room temperature for one hour. The carbon is filtered off and re-extracted first with a 28 liter portion of methanol, then with two 20 liter portions and finally with two 16 liter portions. The observed polarimeter reading of the last portion of the last extract should be less than 0.1°. The combined methanol eluates which contain the desired d-tubocurarine chloride are evaporated to dryness, the residue taken up in 5 liters of methanol and treated with 25 g. of activated bone charcoal (e. g. Darco G-60). The mixture is filtered and the filtrate evaporated to dryness. If desired, this decolorizing treatment may be eliminated without impairing the yield or the purity of the final product. Also, if desired, acetone containing a small amount of water may be substituted for methanol in this step of the process.

The residue is dissolved in 2 cc. of hot water per gram of material and the solution clarified by filtration through an asbestos filter mat. The filtrate is added gradually with vigorous agitation to a saturated aqueous picric acid solution. 10 liters of saturated picric acid solution are used for each 100 g. of residue from the methanol eluates. After the addition has been completed the mixture is stirred at room temperature for about a hour and a half and then the orange-yellow picrate salt collected, washed with one liter of saturated picric acid solution and dried at about 80° C. If desired, the drying of the salt may be omitted as the amount of water present in the material does not materially influence the results obtained in the next step of the process.

The dry picrate salt is dissolved in 2 liters of acetone per 100 g. of picrate and the solution treated with 30 g. of activated bone charcoal (e. g. Darco 60-G). The charcoal is removed by filtration and the filtrate diluted with an equal volume of distilled water. The treatment with decolorizing charcoal can be omitted, if desired, without affecting the nature or purity of the final product.

An acid-adsorbing resin column containing about 500 g. of a synthetic acid-adsorbing resin containing free amino groups such as the polyamine formaldehyde type known as Amberlite IR-4B, for each 100 g. of picrate salt is saturated with hydrogen chloride by washing it with 4% hydrochloric acid until no more acid is adsorbed. We have found that a column whose height is approximately eight times its diameter possesses about the optimal proportions. After washing the column with water to remove excess free acid and then with 50% aqueous acetone the column is ready for use.

The aqueous acetone solution of the d-tubocurarine picrate is slowly passed through (about 10 gal. per hour per 32 lbs. of resin) the column of acid-adsorbing resin saturated with hydrogen chloride and the amber-colored effluent collected in two liter fractions. Each fraction is tested for observed rotation in a polarimeter. The column is washed with 50% aqueous acetone until the fractions show an observed polarimeter rotation of 0.1° or less. All the fractions showing an observed rotation of more than 0.1° are combined and concentrated in vacuo to the point of crystallization. The d-tubocurarine chloride which crystallizes out on cooling is collected and washed with a small amount of acetone. The aqueous filtrate is concentrated in vacuo to a syrup, a small amount of water added and the vessel scratched to induce crystallization. The d-tubocurarine chloride which separates is collected as before and washed with acetone. The concentration and crystallization process is repeated until no more crystalline product can be obtained. The acetone wash solutions are combined, evaporated to dryness and the residue taken up in a small amount of water. On cooling more of the crystalline product is obtained.

The crystalline material, obtained in the manner described above, is combined and recrystallized from hot water using 4.5 cc. of water per gram of material. The crystalline d-tubocurarine chloride is washed with acetone and the acetone wash and aqueous filtrate concentrated to obtain additional crops of the purified material. The recrystallized d-tubocurarine chloride is white in color and gives a clear, colorless solution in water at a concentration of 4 mg./cc.

The total yield of recrystallized material is about 200 g. having a pharmacological activity of about 6.5 units per mg.

*Example 2*

100 g. of d-tubocurarine picrate (prepared as described in Example 1) is dissolved in 2 liters of acetone and the solution, after charcoaling with a small amount of activated carbon, diluted to a volume of about 4 liters.

An acid-adsorbing resin column containing 500 g. of a synthetic acid-absorbing resin containing free amino groups such as the polyamine formaldehyde type known as Amberlite IR-4 is saturated with sulfuric acid by washing it with 4% sulfuric acid until no more acid is adsorbed. The column is then washed first with water and then with 50% aqueous acetone.

The aqueous acetone solution of the d-tubocurarine picrate is slowly passed through the column of resin prepared as described in the preceding paragraph and the effluent collected. After washing the column thoroughly with 50% aqueous acetone the washings and effluent are combined and concentrated in vacuo to the point of crystallization. The d-tubocurarine sulfate which separates is collected and washed with acetone. The filtrate and washings are concentrated to obtain further crops of the desired d-tubocurarine sulfate and then all the material combined with the original crop of the product and recrystallized from water. The d-tubocurarine sulfate thus obtained is white in color and gives a clear, colorless solution when dissolved in water. This salt also possesses pharmacological properties commensurate with those exhibited by d-tubocurarine sulfate prepared by other methods.

While the invention has been described in detail using a crude curare extract derived from *Chondrodendron tomentosum*, it should be understood that crude curare extracts of other botanical origins which contain d-tubocurarine chloride may also be employed in our process. For example, the so-called "Gill" curare, a curare of mixed and varying botanical origin may be used.

What we claim as our invention is:

1. Process for obtaining a d-tubocurarine salt of a mineral acid in substantially pure form which comprises adsorbing the d-tubocurarine chloride present in an aqueous extract of crude curare on activated carbon, selectively eluting said d-tubocurarine chloride by treating said carbon with an organic solvent containing less than about 10% water and selected from the class consisting of water-miscible, lower aliphatic alcohols and ketones, evaporating said solvent from the eluate, dissolving the residue in water, treating the resultant solution with picric acid, contacting the resultant picrate dissolved in an aqueous solution of a solvent of the class consisting of water-miscible, lower aliphatic ketones and alcohols with an acid-adsorbing resin containing an adsorbed mineral acid, concentrating the resultant solution and recovering the d-tubocurarine salt of a mineral acid therefrom.

2. Process for obtaining d-tubocurarine chloride in substantially pure form which comprises adsorbing the d-tubocurarine chloride present in an aqueous extract of crude curare on activated carbon, selectively eluting said d-tubocurarine chloride by treating said carbon with an organic solvent containing less than about 10% water and selected from the class consisting of water-miscible lower aliphatic alcohols and ketones, evaporating said solvent from the eluate, dissolving the residue in water, treating the resultant solution with picric acid, contacting the resultant picrate dissolved in an aqueous solution of a solvent of the class consisting of water-miscible, lower aliphatic ketones and alcohols with an acid-adsorbing resin containing adsorbed hydrogen chloride, concentrating the resultant solution and recovering the d-tubocurarine chloride therefrom.

3. Process for obtaining a d-tubocurarine salt of a mineral acid in substantially pure form which comprises adsorbing the d-tubocurarine chloride present in an aqueous extract of crude curare on activated carbon, selectively eluting said d-tubocurarine chloride by treating said carbon with a water-miscible, lower aliphatic alcohol containing less than about 10% water, evaporating said alcohol from the eluate, dissolving the residue in water, treating the resultant solution with picric acid, contacting the resultant picrate dissolved in an aqueous solution of a water-miscible, lower aliphatic ketone with an acid-adsorbing resin containing an adsorbed mineral acid, concentrating the resultant solution and recovering the d-tubocurarine salt of a mineral acid therefrom.

4. Process for obtaining d-tubocurarine chloride in substantially pure form which comprises adsorbing the d-tubocurarine chloride present in an aqueous extract of crude curare on activated carbon, selectively eluting said d-tubocurarine chloride by treating said carbon with a water-miscible, lower aliphatic alcohol containing less than about 10% water, evaporating said alcohol from the eluate, dissolving the residue in water, treating the resultant solution with picric acid, contacting the resultant picrate dissolved in an aqueous solution of a water-miscible, lower aliphatic ketone with an acid-adsorbing resin containing adsorbed hydrogen chloride, concentrating the resultant solution and recovering the d-tubocurarine chloride therefrom.

5. Process for obtaining a d-tubocurarine salt of a mineral acid in substantially pure form which comprises adsorbing the d-tubocurarine chloride present in an aqueous extract of crude curare on activated carbon, selectively eluting said d-tubocurarine chloride by treating said carbon with methanol containing less than about 10% water, evaporating said methanol from the eluate, dissolving the residue in water, treating the resultant solution with picric acid, contacting the resultant picrate dissolved in aqueous acetone with an acid-adsorbing resin containing an adsorbed mineral acid, concentrating the resultant solution and recovering the d-tubocurarine salt of a mineral acid therefrom.

6. Process for obtaining d-tubocurarine chloride in substantially pure form which comprises adsorbing the d-tubocurarine chloride present in an aqueous extract of crude curare on activated carbon, selectively eluting said d-tubocurarine chloride by treating said carbon with methanol containing less than about 10% water, evaporating said methanol from the eluate, dissolving the residue in water, treating the resultant solution with picric acid, contacting the resultant picrate dissolved in aqueous acetone with an acid-adsorbing resin containing adsorbed hydrogen chloride, concentrating the resultant solution and recovering the d-tubocurarine chloride therefrom.

7. In a process for obtaining a d-tubocurarine salt of a mineral acid in substantially pure form, the step which comprises adsorbing the d-tubocurarine chloride present in a aqueous extract of crude curare on activated carbon and selectively eluting said d-tubocurarine chloride by treating said carbon with an organic solvent containing less than about 10% water and selected from the class consisting of water-miscible, lower aliphatic alcohols and ketones.

8. In a process for obtaining a d-tubocurarine salt of a mineral acid in substantially pure form, the step which comprises adsorbing the d-tubocurarine chloride present in a aqueous extract of crude curare on activated carbon and selectively eluting said d-tubocurarine chloride by treating said carbon with a water-miscible, lower aliphatic alcohol containing less than about 10% water.

9. In a process for obtaining a d-tubocurarine salt of a mineral acid in substantially pure form, the step which comprises adsorbing the d-tubocurarine chloride present in a aqueous extract of crude curare on activated carbon and selectively eluting said d-tubocurarine chloride by treating said carbon with methanol containing less than about 10% water.

10. In a process for obtaining a d-tubocurarine salt of a mineral acid in substantially pure form, the step which comprises contacting d-tubocurarine picrate in an aqueous solution of a solvent of the class consisting of water-miscible, lower aliphatic ketones and alcohols with an acid-adsorbing resin containing an adsorbed mineral acid.

11. In a process for obtaining d-tubocurarine chloride in substantially pure form, the step which comprises contacting d-tubocurarine picrate in an aqueous solution of a solvent of the class consisting of water-miscible, lower aliphatic ketones and alcohols with an acid-adsorbing resin containing adsorbed hydrogen chloride.

12. In a process for obtaining a d-tubocurarine salt of a mineral acid in substantially pure form, the step which comprises contacting d-tubocurarine picrate in an aqueous solution of a water-miscible, lower aliphatic ketone with an acid-adsorbing resin containing an adsorbed mineral acid.

13. In a process for obtaining d-tubocurarine chloride in substantially pure form, the step which comprises contacting d-tubocurarine picrate in an aqueous solution of a water-miscible, lower aliphatic ketone with an acid-adsorbing resin containing adsorbed hydrogen chloride.

14. In a process for obtaining a d-tubocurarine salt of a mineral acid in substantially pure form, the step which comprises contacting d-tubocurarine picrate in an aqueous acetone solution with an acid-adsorbing resin containing an adsorbed mineral acid.

15. In a process for obtaining d-tubocurarine chloride in substantially pure form, the step which comprises contacting d-tubocurarine picrate in an aqueous acetone solution with an acid-adsorbing resin containing adsorbed hydrogen chloride.

NICKOLAS D. JENESEL.
WILLIAM R. COLEMAN.
HARRY M. CROOKS, Jr.

REFERENCES CITED

The following references are of record in the file of this patent:

UNITED STATES PATENTS

| Number | Name | Date |
|---|---|---|
| 2,157,510 | Urbain et al. | May 9, 1939 |
| 2,409,241 | Bashour | Oct. 15, 1946 |

OTHER REFERENCES

Meyers, Ind. and Eng. Chem., vol. 35, pp. 858–863 (1943).